United States Patent
Chiu et al.

(10) Patent No.: US 9,110,843 B2
(45) Date of Patent: Aug. 18, 2015

(54) RACK AND METHOD THEREOF FOR SIMULTANEOUSLY UPDATING BASIC INPUT OUTPUT SYSTEMS

(71) Applicants: Inventec (Pudong) Technology Corporation, Shanghai (CN); INVENTEC CORPORATION, Taipei (TW)

(72) Inventors: Kuo-Shu Chiu, Taipei (TW); Chao-Wei Chang, Taipei (TW); Jo-Yu Chang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 233 days.

(21) Appl. No.: 13/802,971

(22) Filed: Mar. 14, 2013

(65) Prior Publication Data

US 2014/0123121 A1    May 1, 2014

(30) Foreign Application Priority Data

Oct. 31, 2012    (CN) .......................... 2012 1 0429920

(51) Int. Cl.
*G06F 9/445* (2006.01)
*G06F 11/14* (2006.01)

(52) U.S. Cl.
CPC ............ *G06F 11/1433* (2013.01); *G06F 8/665* (2013.01)

(58) Field of Classification Search
USPC .......................................................... 717/168
See application file for complete search history.

(56) References Cited

U.S. PATENT DOCUMENTS

| 2006/0190768 | A1* | 8/2006 | Kawase ........................... 714/31 |
| 2007/0186086 | A1* | 8/2007 | Lambert et al. .................... 713/1 |
| 2008/0127159 | A1* | 5/2008 | Regenmorter ................ 717/168 |
| 2012/0072896 | A1* | 3/2012 | Watanabe et al. ............. 717/170 |
| 2012/0239920 | A1* | 9/2012 | Yang .................................. 713/2 |
| 2013/0125107 | A1* | 5/2013 | Bandakka et al. ............ 717/171 |
| 2013/0139141 | A1* | 5/2013 | Wang ............................. 717/170 |

FOREIGN PATENT DOCUMENTS

| TW |   I273383 B  | 2/2007 |
| TW | 200907804 A | 2/2009 |

* cited by examiner

*Primary Examiner* — John Chavis
(74) *Attorney, Agent, or Firm* — Locke Lord LLP; Tim Tingkang Xia, Esq.

(57) ABSTRACT

A rack including a rack management controller and a plurality of server nodes, is disclosed. The rack management controller receives a firmware updating file, and generates an updating message according to the firmware updating file. Each of the plurality of server nodes includes a memory and a baseboard management controller. The memory stores firmware of a basic input output system. The baseboard management controller is coupled to the rack management controller and the memory. The baseboard management controller receives the updating message to download the firmware updating file from the rack management controller and to stores it to a storage space. The baseboard management controller controls the memory to enter a recovery mode after downloading the firmware updating file, and writes the firmware updating file into the memory to update the firmware of the basic input output system.

5 Claims, 3 Drawing Sheets

RACK AND METHOD THEREOF FOR SIMULTANEOUSLY UPDATING BASIC INPUT OUTPUT SYSTEMS

CROSS-REFERENCE TO RELATED APPLICATIONS

This non-provisional application claims priority under 35 U.S.C. §119(a) on Patent Application No(s). 201210429920.6 filed in China on Oct. 31, 2012, the entire contents of which are hereby incorporated by reference.

BACKGROUND

1. Technical Field

The disclosure relates to a rack and an updating method thereof; in particular, to a rack and a method thereof for simultaneously updating a plurality of basic input output systems.

2. Related Art

Generally, every motherboard in a server has a basic input output system (BIOS) memory storing firmware of a basic input output system. It is necessary for the firmware stored in the memory, to be updated in order to maintain the server and update its some functions. To update the present firmware of the basic input output system, the manager has to take the memory apart and then to use an updating equipment to write a new version or any version of the firmware into the memory, so as to update the firmware stored in the memory.

However, the more the need of the server, the more the motherboards in the server are, thereby providing better services. When the basic input output systems of many motherboards are updated in the above mentioned manner, the worker has to update the basic input output systems of all of the motherboards in the sever one by one. This causes the working time spent on the updating of the basic input output systems being too long, and reduces the efficiency of firmware updating.

SUMMARY

A rack disclosed in the disclosure includes a rack management controller and a plurality of server nodes. The rack management controller receives a firmware updating file and generates an updating message according to the firmware updating file. Each of the plurality of server nodes includes a memory and a baseboard management controller. The memory stores firmware of the basic input output system. The baseboard management controller is coupled to the rack management controller and the memory. The baseboard management controller receives an updating message to download the firmware updating file from the rack management controller and stores the firmware updating file in a storage space. The baseboard management controller controls the memory to enter a recovery mode after downloading the firmware updating file, so as to write the firmware updating file into the memory for updating the firmware of the basic input output system.

In an embodiment, the rack management controller and the baseboard management controller transmit data to each other through a transmission path.

In an embodiment, the baseboard management controller outputs a responding message to the rack management controller according to the updating message. The rack management controller determines whether the responding message is received. If the responding message is received, the corresponding baseboard management controller downloads the firmware updating file from the rack management controller. If the responding message is not received, the rack management controller further determines whether a number of times that the responding message is not received is greater than a predetermined value. If the number of times that the responding message is not received is not greater than the predetermined value, the rack management controller outputs the updating message to the corresponding baseboard management controller again. If the number of times that the responding message is received is greater than the predetermined value, the rack management controller generates an updating error message.

In an embodiment, the baseboard management controller in each of the plurality of server nodes determines whether the firmware of the corresponding basic input output system is updated successfully. If the firmware of the corresponding basic input output system is not updated successfully, the baseboard management controller outputs an error message to the rack management controller. If the firmware of the corresponding basic input output system is updated successfully, the baseboard management controller outputs an updating complete message to the rack management controller, and the baseboard management controller controls the corresponding memory to enter a booting mode from the recovery mode.

A method for simultaneously updating a plurality of basic input output systems, disclosed in the disclosure is applied to a rack. The rack includes a rack management controller and a plurality of server nodes. Each of the plurality of server nodes includes a memory and a baseboard management controller. The method includes the following steps. A firmware updating file is received by the rack management controller. An updating message is outputted to the baseboard management controller in each of the plurality of server nodes according to the firmware updating file. The firmware updating file is downloaded by the baseboard management controller from the rack management controller according to the updating message. The memory is controlled by the baseboard management controller to enter a recovery mode. The memory stores firmware of the basic input output system. The firmware updating file is written into the memory, so as to update the firmware of the basic input output system.

In an embodiment, before the step of downloading the firmware updating file from the rack management controller, the method further includes the following steps. A responding message is generated by the baseboard management controller according to the updating message. Whether the responding message is received is determined. If the responding message is received, the firmware updating file is downloaded by the baseboard management controller from the rack management controller. If the responding message is not received, whether a number of times that the responding message is not received is greater than a predetermined value is determined. If the number of times that the responding message is not received is not greater than the predetermined value, the updating message is outputted to the corresponding baseboard management controller. If the number of times that the responding message is not received is greater than the predetermined value, an updating error message is generated.

In an embodiment, after the step of updating the firmware of each of the plurality of basic input output systems, the method further includes the following steps. Whether the firmware of each of the plurality of basic input output systems is updated successfully is determined. If the firmware of one of the plurality of basic input output systems is not updated successfully, an error message is outputted by the corresponding baseboard management controller to the rack management controller. If the firmware of each of the plurality of basic input output systems is updated successfully, an updating complete message is respectively outputted by the baseboard management controller in each of the plurality of server nodes to the rack management controller, and the corresponding memory is controlled by the baseboard management controller in each of the plurality of server nodes to enter a booting mode from the recovery mode.

BRIEF DESCRIPTION OF THE DRAWINGS

The disclosure will become more fully understood from the detailed description given herein below for illustration only, and thus is not limitative of the disclosure, and wherein.

DETAILED DESCRIPTION

Figure 1:
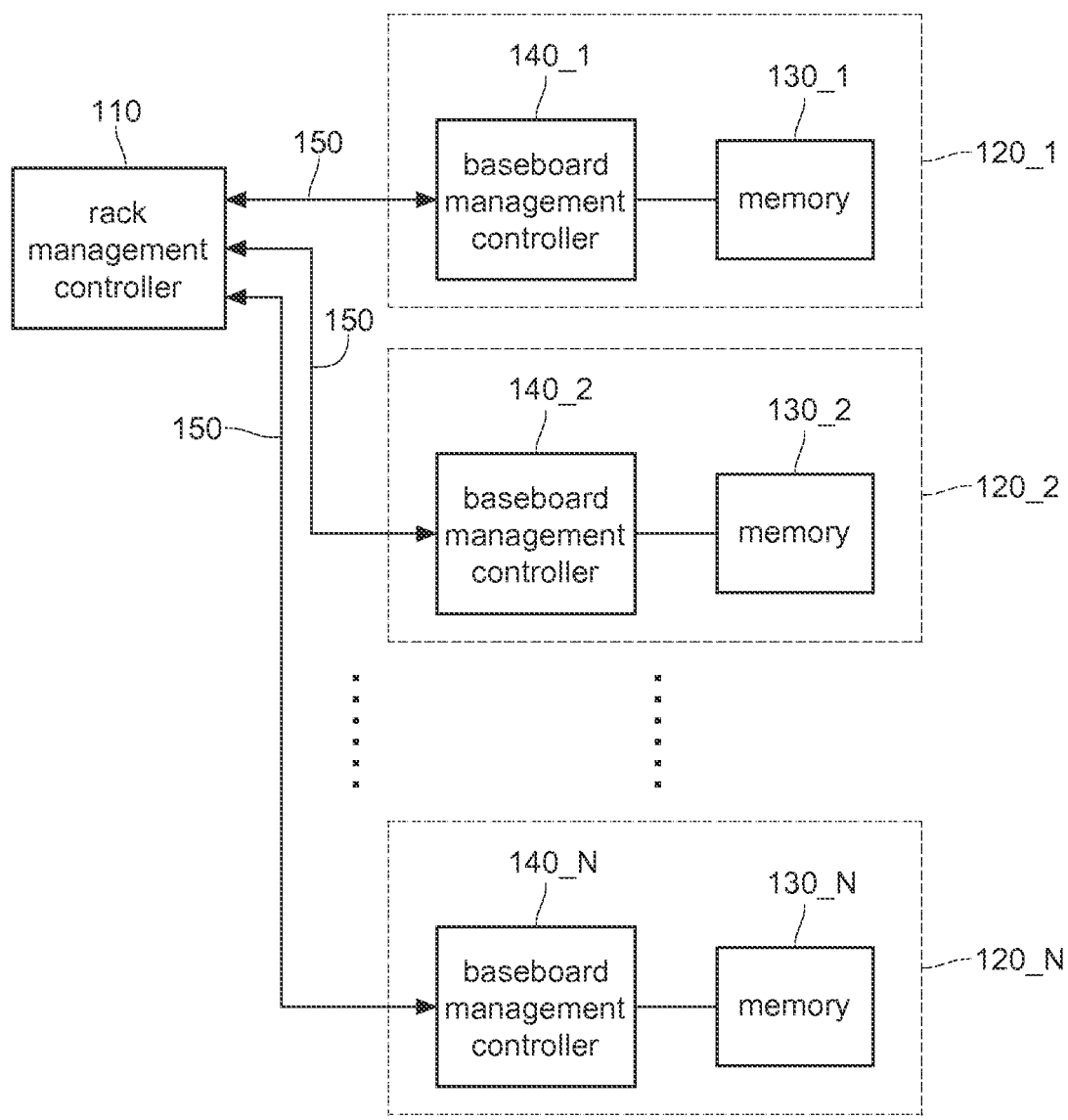
FIG. 1 shows a schematic diagram of a rack according to the disclosure.

FIG. 1 is a schematic diagram of a rack according to the disclosure. The rack 100 includes a rack management controller (RMC) 110 and server nodes 120_1 to 120_N, wherein N is a positive integer greater than 1. Each of the server nodes 120_1 to 120_N is considered as an independent server. In addition, the rack management controller 110 is, for example, an independent server or an independent control device.

The rack management controller 110 receives a firmware updating file, and generates an updating message according to the firmware updating file. That is, the user can upload a new version or any version of the firmware of a basic input output system (BIOS) to the rack management controller 110 by using wired networks or wireless networks. The rack management controller 110 thereby executes the following processes to updating the firmware of the basic input output system. The firmware updating file is, for example, an international organization for standardization (ISO) image file.

In an embodiment of the disclosure, when a plurality of racks 100 are all connected to an upper level controller, the manager can upload a new version or any version of the basic input output system (BIOS) to the upper level controller through wired networks or wireless networks, and the upper level controller then transmits the firmware updating file to each of the racks 100.

Each of the server nodes 120_1 to 120_N includes a memory, for example, any one of the memories 130_1 to 130_N, and a baseboard management controller (BMC), for example, any one of the baseboard management controllers 140_1 to 140_N. The memories 130_1 to 130_N respectively store the basic input output systems.

The baseboard management controllers 140_1 to 140_N are respectively coupled to the rack management controller 110 and to the memories 130_1 to 130_N, and respectively receive the updating message, so as to be notified to update the firmware. Subsequently, the baseboard management controllers 140_1 to 140_N download the firmware updating file from the rack management controller 110 according to the updating message, and store the firmware updating file in their storage spaces.

In an embodiment, the storage spaces are, for example, the virtual spaces formed by the baseboard management controllers 140_1 to 140_N. Specifically, the virtual spaces are, for example, the spaces delivered from the memories 130_1 to 130_N or the hard disks in the corresponding server nodes 120_1 to 120_N respectively by the baseboard management controllers 140_1 to 140_N. In another embodiment, the storage spaces are respectively provided by the registers in the baseboard management controllers 140_1 to 140_N.

After downloading the firmware updating file, the baseboard management controllers 140_1 to 140_N control the memories 130_1 to 130_N to enter a recovery mode. The baseboard management controllers 140_1 to 140_N write the firmware updating file stored in the storage spaces, into the memories 130_1 to 130_N, so as to update the firmware of each of the basic input output systems of the memories 130_1 to 130_N.

Specifically, the user uploads the firmware updating file, such as a firmware of a new version of the basic input output system, to the rack management controller 110. When receiving the firmware updating file, the rack management controller 110 correspondingly outputs an updating message to the baseboard management controllers 140_1 to 140_N respectively. After receiving the updating message, the baseboard management controllers 140_1 to 140_N respectively generate the responding message to the rack management controller 110 according to the updating message.

Subsequently, the rack management controller 110 determines whether the responding message is received. If the responding message is received, that means the baseboard management controllers 140_1 to 140_N are in a normal status. Herein, the baseboard management controllers 140_1 to 140_N download the firmware updating file from the rack management controller 110.

If the responding message is not received, the rack management controller 110 further determines whether the number of times that the responding message is not received is greater than a predetermined value or not.

If the number of times that the responding message is not received is not greater than the predetermined value, the rack management controller 110 outputs an updating message to corresponding one of the baseboard management controllers 140_1 to 140_N again, for notifying the corresponding one of the baseboard management controllers 140_1 to 140_N to execute the following process of updating the firmware of each of the basic input output systems, until the number of times that the responding message is not received is greater than the predetermined value. If the number of times that the responding message is not received is greater than the predetermine value, the rack management controller 110 generates an updating error message. The updating error message is transmitted to, for example, a monitor or light emitting diodes to be shown. Therefore, the user can be notified that some errors occur in the firmware updating process, and correct them thereby.

After downloading the firmware updating file from the rack management controller 110, the baseboard management controllers 140_1 to 140_N further control the memories 130_1 to 130_N respectively to enter the recovery mode, for example, changing from the booting mode to the recovery mode. Herein, the baseboard management controllers 140_1 to 140_N write the firmware updating file into the memories 130_1 to 130_N, for replacing the original basic input output systems of the memories 130_1 to 130_N by the new version of the basic input output system.

Then, the baseboard management controllers 140_1 to 140_N determine whether the basic input output systems are updated successfully or not. If the basic input output systems are not successfully updated, the baseboard management controllers 140_1 to 140_N respectively and correspondingly output the error message to the rack management controller 110. According to the error messages, the rack management controller 110 outputs a corresponding signal to the monitor or the light emitting diodes, for showing corresponding message. Through the message, the user can know that some errors occur in the firmware updating process, for example, the basic input output system is not updated successfully, and can do corresponding processes.

On the other hand, if the basic input output systems are updated successfully, the baseboard management controllers 140_1 to 140_N respectively and correspondingly output the updating complete message to the rack management controller 110. The rack management controller 110 outputs a corresponding signal to the monitor or the light emitting diodes according to the updating complete message, for showing corresponding messages, whereby the user can know that the firmware is updated completely and successfully.

In addition, the baseboard management controllers 140_1 to 140_N control the memories 130_1 to 130_N to enter the booting mode from the recovery mode, and shut down the server nodes 120_1 to 120_N. After the server nodes 120_1 to 120_N are restarted, the basic input output systems work in the booting mode, whereby the server nodes 120_1 to 120_N can boot correctly and operate normally.

In this embodiment, when the rack 100 needs to update the basic input output systems, the power supply of the rack 100 provides the alternating current (AC) power to the server nodes 120_1 to 120_N, whereby all the baseboard management controllers 140_1 to 140_N in the server nodes 120_1 to 120_N are enabled.

When the rack 100 starts to update the basic input output systems of the server nodes 120_1 to 120_N being in a turned-off state, the baseboard management controllers 140_1 to 140_N respectively turn on the server nodes 120_1 to 120_N after receiving the updating message. When the server nodes 120_1 to 120_N are turned on, the server nodes 120_1 to 120_N still use the firmware of the old basic input output systems for booting. Herein, the basic input output systems detect the updating firmware file received by the baseboard management controllers 140_1 to 140_N, and then execute the operations in the recovery mode, for performing the firmware updating process. After the firmware is updated completely, the baseboard management controllers 140_1 to 140_N respectively shut down the server nodes 120_1 to 120_N. Thus, if the server nodes 120_1 to 120_N are turned on at the next time, the firmware of each of the new basic input output systems will be used for booting.

In addition, when the rack 100 starts to update the basic input output systems of the server nodes 120_1 to 120_N being in a turned-on status, after the baseboard management controllers 140_1 to 140_N receive the updating message, the baseboard management controllers 140_1 to 140_N respectively shut down the server nodes 120_1 to 120_N, for executing the firmware updating processes.

Specifically, in an embodiment, after turning off the server nodes 120_1 to 120_N, the baseboard management controllers 140_1 to 140_N respectively boot the server nodes 120_1 to 120_N by using the old basic input output systems. Subsequently, the baseboard management controllers 140_1 to 140_N perform the operations of the recovery mode by the updating firmware, so as to execute the firmware updating process.

In another embodiment, when the baseboard management controllers 140_1 to 140_N wait until the rack management controller 110 does not assign any tasks to the server nodes 120_1 to 120_N (such as the server nodes which need to update firmware) and when the server nodes 120_1 to 120_N complete their present work, the baseboard management controllers 140_1 to 140_N shut down the server nodes 120_1 to 120_N. Then, the baseboard management controllers 140_1 to 140_N boot the server nodes 120_1 to 120_N by the firmware of each of the old basic input output systems, and to execute the operations of the recovery mode by using the updating firmware file, in order to perform the firmware updating process.

In this embodiment, the rack management controller 110 and the baseboard management controllers 140_1 to 140_N transmit data to each other through a transmission path 150. The transmission path 150 is, for example, an intelligent platform management interface (IPMI) and a web user interface, etc.

On the basis of the above explanations of the embodiments, a method for simultaneously updating a plurality of basic input output systems, is accordingly derived as follows.

Figure 2:
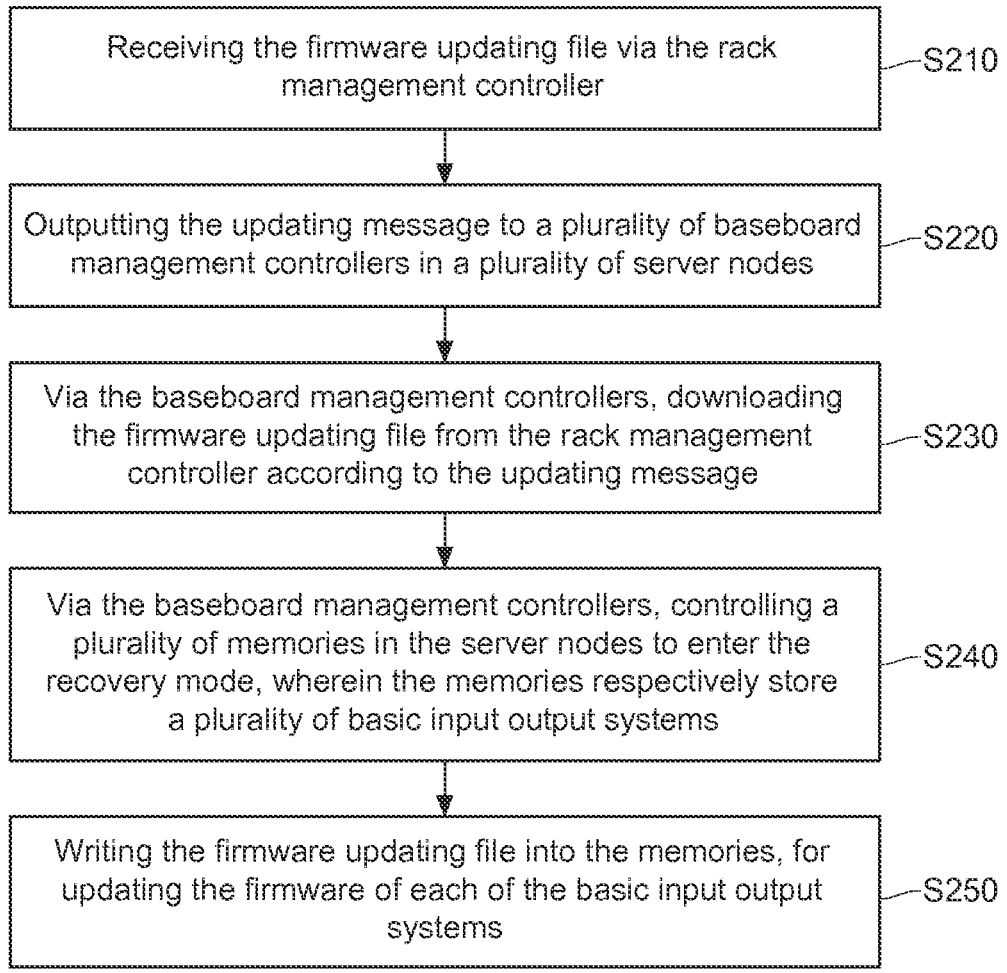
FIG. 2 shows a flow chart of a method for simultaneously updating a plurality of basic input output systems according to the disclosure.

FIG. 2 is a flow chart of a method for simultaneously updating firmware of each of a plurality of basic input output systems, according to the disclosure. The method for simultaneously updating firmware of each of a plurality of basic input output systems, is applied to a rack which includes a rack management controller and a plurality of server nodes. Each of the plurality of server nodes includes a memory and a baseboard management controller.

In step S210, the rack management controller receives a firmware updating file. In Step S220, an updating message is outputted to the baseboard management controller in each of the plurality of server nodes, according to the firmware updating file.

In step S230, the baseboard management controllers download the firmware updating file from the rack management controller according to the updating message. In step S240, in each of the server nodes, the baseboard management controller controls the memory to enter a recovery mode. Each of the memories stores the firmware of a basic input output system. In step S250, the firmware updating file is written into the memories for updating the firmware of each of the basic input output systems.

Figure 3:
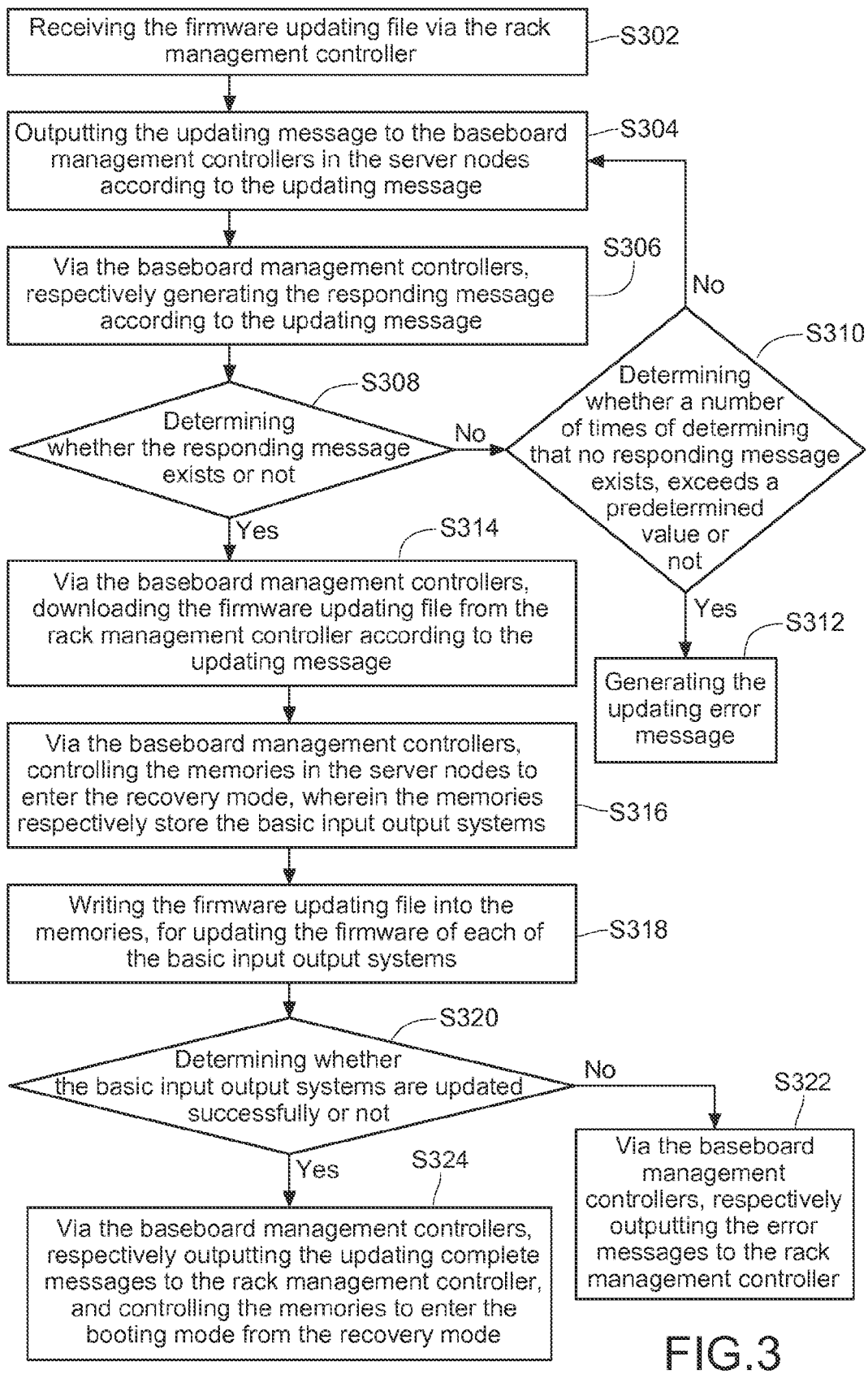
FIG. 3 shows a flow chart of another method for simultaneously updating a plurality of basic input output systems according to the disclosure.

FIG. 3 is a flow chart of another method for simultaneously updating firmware of each of a plurality of basic input output systems, according to the disclosure. This embodiment of the method for simultaneously updating firmware of each of a plurality of basic input output systems, is applied to a rack including a rack management controller and a plurality of server nodes. Each of the server nodes includes a memory and a baseboard management controller.

In step S302, the rack management controller receives a firmware updating file. In step S304, an updating message is outputted to the baseboard management controller in each of the server nodes according to the firmware updating file. In step S306, the baseboard management controller in each of the server nodes generates a responding message according to the updating message.

In step S308, whether the responding message is received is determined. If the responding message is not received, whether a number of times that the responding message is not received is greater than a predetermined value is determined in step S310. If the number of times is not greater than the predetermined value, the process returns to step S304, in which the updating message is outputted to the baseboard management controller in the corresponding server node according to the firmware updating file again. On the other hand, if the number of times is greater than the predetermined value, an updating error message is generated in step S312.

However, if the responding message is received in step S308, the corresponding baseboard management controller downloads the firmware updating file from the rack management controller according to the updating message in step 314. In step S316, the baseboard management controller controls the corresponding memory to enter the recovery mode. Each of the memories stores the firmware of a basic input output system. In step S318, the firmware updating file is written into the corresponding memory, for updating the firmware of the basic input output system.

In step S320, whether the firmware of each of the basic input output systems is updated successfully is determined. If the firmware of one of the basic input output systems is not updated successfully, the corresponding baseboard management controller outputs an error message to the rack management controller in step S322. If the firmware of each of the basic input output systems is successfully updated, the baseboard management controllers respectively output an updating complete message to the rack management controller, and control the memories to enter the booting mode from the recovery mode in step S324.

In the disclosure, the rack management controller generates the updating message according to the received firmware updating file and simultaneously transmits the updating message to the baseboard management controllers in the rack. According to the updating message, the baseboard management controllers respectively download the firmware updating file from the rack management controller, and control the memories to enter the recovery mode, so as to respectively write the firmware updating file into the memories to update the firmware of each of the basic input output systems. Therefore, the work time of firmware updating may be effectively reduced, and the efficiency of firmware updating may also be increased.

What is claimed is:

1. A rack, comprising:
   a rack management controller, for receiving a firmware updating file, and generating an updating message according to the firmware updating file; and
   a plurality of server nodes, each of the plurality of server nodes comprising:
      a memory, for storing firmware of a basic input output system; and
      a baseboard management controller, coupled to the rack management controller and the memory, for receiving the updating message to download the firmware updating file from the rack management controller and store the downloaded firmware updating file in a storage space, and for controlling the memory to enter a recovery mode after downloading the firmware updating file, to write the firmware updating file into the memory so as to update the firmware of the basic input output system;
   wherein according to the updating message, the baseboard management controller of each of the plurality of server nodes outputs a responding message to the rack management controller, the rack management controller determines whether the responding message is received, if the responding message is received, the corresponding baseboard management controller downloads the firmware updating file from the rack management controller, if the responding message is not received, the rack management controller determines whether a number of times that the responding message is not received is greater than a predetermined value or not, if the number of times that the responding message is not received is not greater than the predetermined value, the rack management controller outputs the updating message to the corresponding baseboard management controllers again, and if the number of times that the responding message is not received is greater than the predetermined value, the rack management controller generates an updating error message.

2. The rack according to claim 1, wherein the rack management controller and the baseboard management controller in each of the plurality of server nodes transmit data to each other through a transmission path.

3. The rack according to claim 1, wherein the baseboard management controller in each of the plurality of server nodes determines whether the firmware of the basic input output system is updated successfully or not, if the firmware of the basic input output system is not updated successfully, the corresponding baseboard management controller outputs an error message to the rack management controller, and if the firmware of the basic input output system is successfully updated, the corresponding baseboard management controller outputs an updating complete message to the rack management controller and controls the corresponding memory to enter a booting mode from the recovery mode.

4. A method for simultaneously updating firmware of each of a plurality of basic input output systems, applied to a rack comprising a rack management controller and a plurality of server nodes, each of the plurality of server nodes comprising a memory and a baseboard management controller, and the method comprising:
   receiving a firmware updating file via the rack management controller;
   outputting an updating message to the baseboard management controller in each of the plurality of server nodes according to the firmware updating file;
   via the baseboard management controller in each of the plurality of server nodes, outputting a responding message according to the updating message;
   determining whether the responding message is received;
   if the responding message is not received, determining whether a number of times that the responding message is not received is greater than a predetermined value or not;
   if the number of times that the responding message is not received is not greater than the predetermined value, performing the step of outputting the updating message to the corresponding baseboard management controller;
   if the number of times that the responding message is not received is greater than the predetermined value, generating an updating error message;
   if the responding message is received, via the baseboard management controller in each of the plurality of server nodes, downloading the firmware updating file from the rack management controller according to the updating message;
   via the baseboard management controller in each of the plurality of server nodes, controlling the memory in each of the plurality of server nodes to enter a recovery mode; and
   writing the firmware updating file into the memory in each of the plurality of server nodes to update the firmware of each of the plurality of basic input output system respectively stored in the memory.

5. The method for simultaneously updating the firmware of each of the plurality of basic input output systems according to claim 4, wherein after the step of updating the firmware of each of the plurality of basic input output systems, the method further comprises:
   determining whether the firmware of each of the plurality of basic input output systems is updated successfully or not;

if a firmware of one of the plurality of basic input output systems is not updated successfully, outputting an error message to the rack management controller;

if the firmware of each of the plurality of basic input output systems is successfully updated, respectively outputting an updating complete message to the rack management controller; and via the baseboard management controller in each of the plurality of server nodes, controlling the corresponding memory to enter a booting mode from the recovery mode.

* * * * *